United States Patent [19]

Hagemann

[11] 4,197,591

[45] Apr. 8, 1980

[54] FACSIMILE RECORDING OF SONIC VALUES OF THE OCEAN BOTTOM

[76] Inventor: Julius Hagemann, 412 S. MacArthur Ave., Panama City, Fla. 32401

[21] Appl. No.: 753,166

[22] Filed: Aug. 4, 1958

[51] Int. Cl.² .................................................. G01S 9/66
[52] U.S. Cl. ........................................ 367/6; 367/88; 367/96; 367/106; 367/113; 367/115
[58] Field of Search .................. 343/5 PR, 17; 11/17; 340/4.5, 3 T, 3 E, 2–6; 43/9, 17.1; 114/25

[56] References Cited

U.S. PATENT DOCUMENTS

| | | | |
|---|---|---|---|
| 1,625,245 | 4/1927 | Dorsey | 340/3 |
| 1,973,719 | 9/1934 | Lake | 340/4.5 X |
| 2,167,492 | 7/1939 | Sproule | 340/3 |
| 2,403,562 | 7/1946 | Smith | 343/17 |
| 2,418,846 | 4/1947 | Meacham | 340/2 |
| 2,433,971 | 1/1948 | Adams | 340/3 |
| 2,476,032 | 7/1949 | Feldman | 343/8 |
| 2,528,119 | 10/1950 | Crosby | 340/2 |
| 2,648,838 | 8/1953 | Raymond | 343/5 PR |
| 2,729,803 | 1/1956 | Harrison | 340/3 |
| 2,729,910 | 1/1956 | Fryklund | 340/3 |
| 2,751,703 | 6/1956 | Kietz | 340/3 |
| 2,821,805 | 2/1958 | Kunze | 43/17.1 |
| 2,825,884 | 3/1958 | Fryklund | 340/3 |
| 2,838,850 | 6/1958 | Stephenson et al. | 340/2 |
| 2,853,824 | 9/1958 | Schutz et al. | 340/3 |
| 2,919,423 | 12/1959 | Williams | 340/3 |
| 2,997,689 | 8/1961 | Johnson et al. | 340/3 |
| 3,005,973 | 10/1961 | Kietz | 340/3 |
| 3,021,807 | 2/1962 | Stedman | 114/23 |

OTHER PUBLICATIONS

Goodell, "Ultrasonic Recorder", *Electronics*, Feb. 1953, pp. 118–121.

*Primary Examiner*—Richard A. Farley
*Attorney, Agent, or Firm*—W. O. Quesenberry; Rolla N. Carter

EXEMPLARY CLAIM

1. A towable spread for surveying a water-submerged surface with a single towing vessel comprising at least two laterally spaced submarine vehicles of which at least one is dirigible, tow cables of substantially equal lengths attached to said vehicles, means operable under towing conditions to cause said vehicles to seek and maintain a preselected constant distance above the surface being surveyed, power means carried by the dirigible vehicle for steering the course of said dirigible vehicle, distance sensing means for deriving a signal corresponding to the lateral separation of the two vehicles, and means responsive to the departure of said derived signal from a preselected value for developing a corresponding control signal for said power means.

4 Claims, 8 Drawing Figures

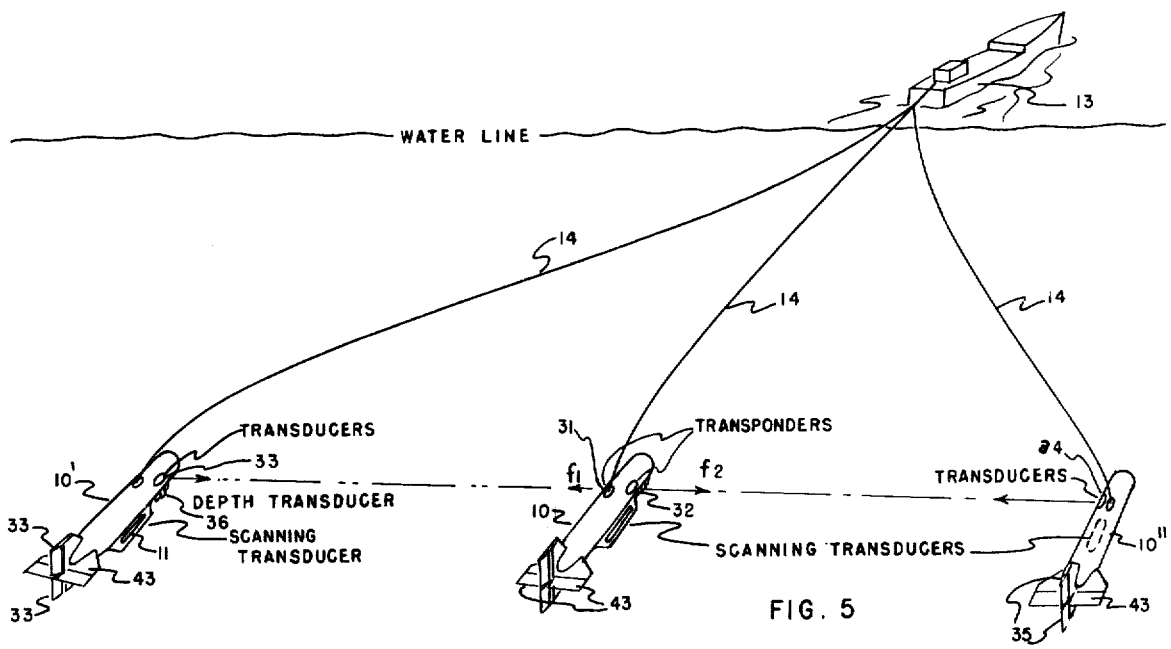
FIG. 5
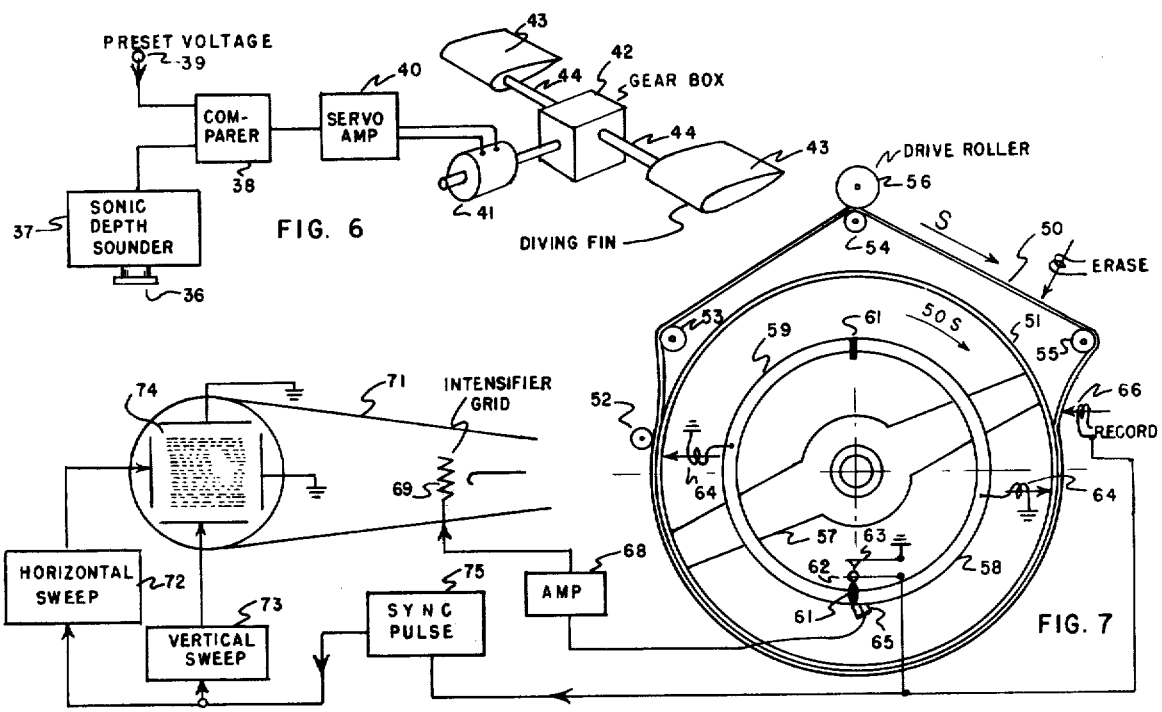
FIG. 6
FIG. 7
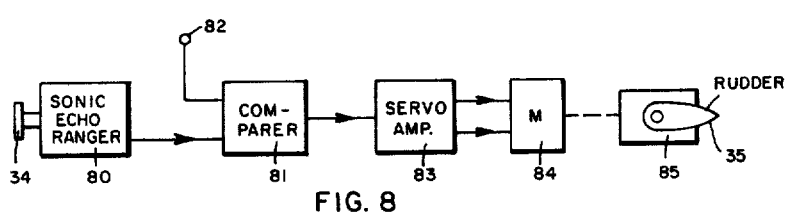
FIG. 8

FACSIMILE RECORDING OF SONIC VALUES OF THE OCEAN BOTTOM

The invention described herein may be manufactured and used by or for the Government of the United States of America for governmental purposes without the payment of any royalties thereon or therefor.

The present invention relates to electro-acoustic signaling systems and more particularly to a system for producing as a legible display or record the sonic echo values of a water-submerged surface. In another aspect the invention relates to a method and system for sonically scanning a water-submerged surface line by line and legibly displaying in the nature of a facsimile thereof the sound reflecting qualities of said surface as viewed obliquely from a station relatively close to said surface, say of the order of twenty feet.

In accordance with a principal feature of the invention an electro-acoustic transmitting and receiving transducer system adapted to scan in range with a narrow fan shaped beam vertically oriented is towed through a body of water at a constant height above the bottom and at a constant rate in a direction orthogonal to the direction of the sonic scanning beam whereby successive scans take place in succession along closely adjacent narrow strips of the submerged surface. The sonic echo values of the submerged surface are by suitable means displayed as a visually legible record, either ephemeral or permanent, the interpretation of which provides information concerning the shape and the dimensions of objects lying proud on the bottom. Oceanographers and workers in the minehunting art designate as lying proud on the bottom objects which protrude above the bottom sufficiently to permit recognition of their approximate size and configuration. This information regarding dimensions and shape (in projection) makes possible classification of bottom objects which classification is in many cases equivalent to identification. Thus, the invention utilizes bottom reverberation as a well defined function of the presence of a bottom object by recording as low intensity markings the flutter echo return from the bottom with an absence of markings corresponding to the acoustic shadow cast by a bottom object. As the transducer vehicle is towed along at a constant height above the bottom and at a constant speed it pulses a narrow beam of sonic energy athwartships. The intersection of each pulse with the bottom wipes or travels outwardly along the bottom so that the returned echo signal due to bottom reflections is similar to that received from flying spot scanning. The pulsed energy scans in range (or time) at right angles to the direction of movement while the forward movement of the vehicle enables the system to scan successive lines in the direction of movement. Thus the sonic echo values of the bottom can be displayed or recorded in the form of a large number of narrow strips. An object on the bottom will be recorded as a highlight and an accompanying lack of signal (shadow) for a time interval corresponding to the height the object extends above the bottom.

In an operating embodiment of the invention a frequency of 1.5 megacycles is employed. The beam width is slightly less than one degree, the pulse rate is 25 per second and the pulse length is 50 microseconds. With these parameters the range resolution, i.e., the length in water of a 50 microseconds pulse, is about three inches and the resolution in azimuth is about three inches at twenty-five yards. The repetition rate limits the range to the order of one hundred feet. At this range there is no objection to the high frequency employed since signal attenuation beyond this range rather than being a drawback gives the advantage of reducing echoes from beyond the field of interest. When the scanning transducer is towed at a height of say fifteen feet above the bottom and at a speed of four knots successive scans along the bottom are spaced slightly more than three inches which is comparable with the range and azimuth resolution of about three inches. As above mentioned the transducer vehicle is towed at a constant height above the bottom to provide a known geometry. The towed vehicle may be maintained at the desired constant height by means of a chain weight or a feeler arm as disclosed in my U.S. Pat. No. 2,823,635 which issued 18 Feb. 1958, but it is preferred in accordance with one aspect of the invention to employ a sonic depth sounder in the vehicle for controlling the diving fins or the depth rudder of the vehicle.

The use of a vehicle having oppositely directed transducers with the above mentioned parameters covers a path along the bottom approximately two hundred feet wide, and in order to increase the width of the scanning path for each pass of the towing vessel a plurality of such scanning systems, e.g., three or more, may be simultaneously towed, the desired lateral separation of the vehicles being controlled by known streaming arrays utilizing paravanes or other diverters, or in accordance with the invention by horizontally oriented echo devices in the outside vehicles sounding their distances from the center vehicle and controlling their lateral rudders to maintain this distance constant, or a combination thereof. Instead of employing echo devices for the purpose of maintaining the desired separations the center vehicle in an array of three is preferably provided with transponders having different ringing and responding frequencies so as to avoid mutual interference. It should be noted that the transducers in the outer vehicles and the transponders in the center vehicle should operate at frequencies such that the order of magnitude of the wave lengths is considerably less than the water path between the two transponders. The vehicles will of course be designed for hydrodynamic stability when under tow and because of their general form and functioning are frequently referred to as fish.

As the intersection of a scanning pulse with the bottom travels along the bottom its speed decreases with distance and at its extreme range approaches the speed of sound in water. Thus in order to obtain a linear recording or display the recording apparatus should scan along a line at substantially corresponding speeds which may be accomplished in a helical recorder by utilizing a variable pitch helix and in a cathode ray tube display by utilizing a suitable horizontal sweep circuit.

The invention will be understood from the following description when read in connection with the accompanying drawing in which:

FIG. 1 is a schematic representation of the apparatus of the invention being towed at sea;

FIGS. 2 and 3 diagrammatically show the sonic scanning arrangement employed in the invention;

FIG. 5 illustrates a towing arrangement for a multiple array of a system similar to that of FIG. 1;

FIG. 6 is a conventionalized showing of an apparatus for practicing one feature of the invention;

FIG. 7 is a conventionalized showing of an arrangement for a two dimensional display of a one dimensional signal, and FIG. 8 shows schematically a rudder control apparatus for a towed vehicle.

Figure 1:
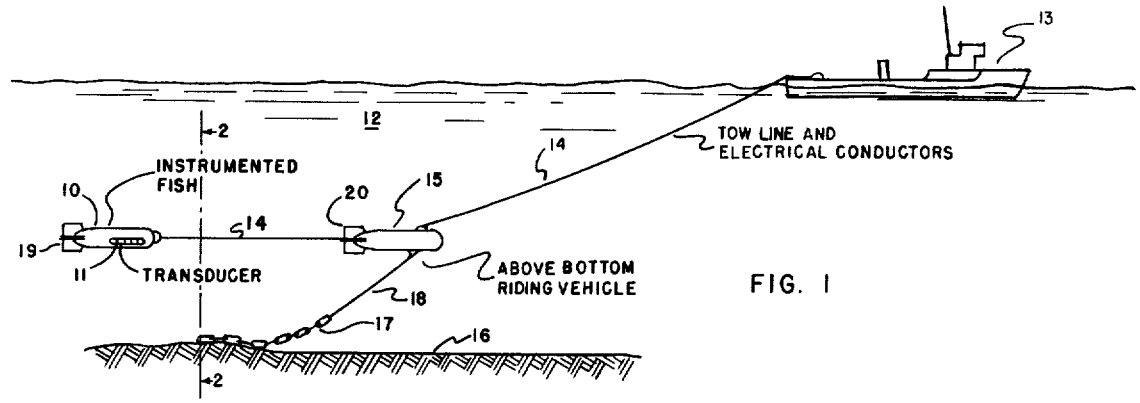

Referring now to FIG. 1 there is shown an instrumented fish 10 provided with a scanning transducer 11 being towed through a body of water 12 by a suitable vessel 13 through a tow line and an electrical conductor cable 14. Secured to the tow line 14 at a suitable distance, say fifteen feet, in front of the fish 10 is a buoyant vehicle 15 adapted to ride at a constant height above the bottom 16 of the body of water 12 by means of the well known arrangement of utilizing a length of chain 17 suitably secured to the vehicle 15 as by a wire 18. The fish 10, which is preferably only slightly buoyant, and the vehicle 15 may be provided with stabilizing fins 19 and 20, respectively. With this towing arrangement the fish 10 tends to maintain a steady course and not to follow small or abrupt undulations occurring in the vehicle 15.

Figure 2:
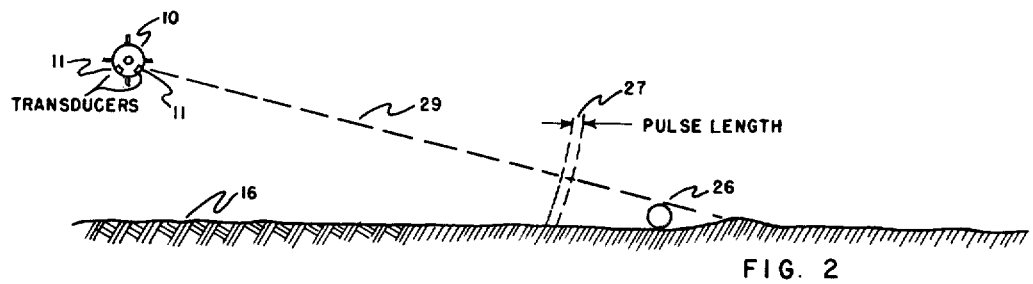
Figure 3:
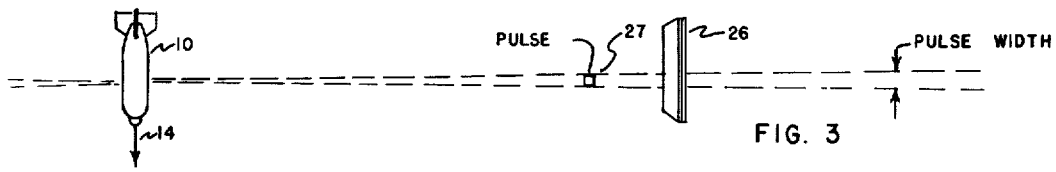

FIGS. 2 and 3 schematically illustrate the scanning accomplished by the transducers 11 as the fish 10 is towed through the water. A pulse 27 of sonic energy transmitted by one of the transducers 11 is shown proceeding outwardly so that the echoes reflected towards the transducer 11 come successively from increments of the bottom 16 farther and farther away. It will be obvious that the rate of advance of the intersection of a pulse 27 with the bottom 16 will be greatest directly under the transducer 11 and progressively decreases with distance so that it approaches the speed of sound in water at its greatest operating distance, here being considered to be approximately one hundred feet. From an inspection of FIG. 2 it will be evident that when the pulse 27 encounters a mine-like object 26 the echo will be stronger, and that while the pulse 27 is traveling between the object 26 and the point, indicated by a broken line 29, where it again strikes the bottom 16 there is no echo.

Figure 4:
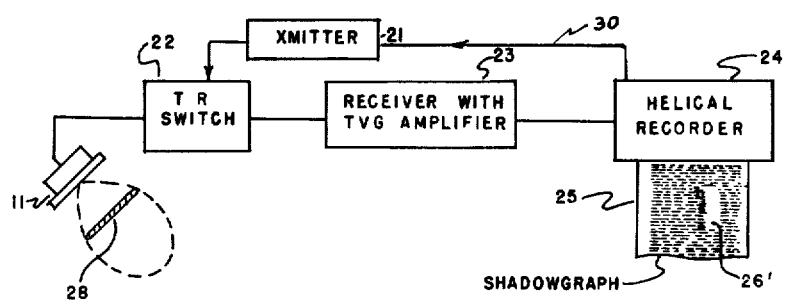
FIG. 4 represents schematically a circuit and recording arrangement employed in the system of FIG. 1.

In FIG. 4 a block diagram of the scanning and recording system is shown as comprising a transmitter 21 which through a transmit-receive switch 22 periodically energizes the transducer 11 to emit short pulses 27 of sonic energy in a directivity pattern indicated by the reference character 28. Separate transducers for transmitting and receiving may of course be employed. The energy of the pulse 27 reflected by the bottom 16 and received by the transducer 11 is passed by the transmit-receive switch 22 to a receiver 23 equipped with a time variant gain amplifier as is well known to maintain constant the receiver output voltage for application to a display device such as a helical recorder 24 which records the received signals on a suitable record medium 25. The recording on the medium 25 may be called a shadowgraph since it presents the acoustic shadow of an object on the ocean floor such as the mine-like object 26 as an area of no signal as indicated at 26' on the record 25. Immediately preceding this acoustic shadow or area of no signal the signal is intensified due to the greater reflectivity of the mine-like object 26 as compared to the reflectivity of the ocean bottom 16. In order to obtain a recording which is linear with respect to the ocean floor a variable pitch helix may be utilized in the recorder 24 to compensate for the variable speed of the intersection of the pulse 27 with the bottom 16.

The "swept" path may be widened by towing a plurality of scanning fish 10, one arrangement utilizing an array of three fish 10 being illustrated in FIG. 5. In this arrangement the center fish is provided on it left and right sides with transponders 31 and 32 which preferably answer respectively with different frequencies $f_1$ and $f_2$. The fish 10' on the left as viewed in FIG. 5 is provided with a right facing transducer 33 which rings the transponder 31 in the center fish 10 and utilizes the answering frequency $f_1$ for controlling rudders 33 carried by the fish 10' to maintain its distance from the center fish 10 at a preselected constant value. Similarly the right hand fish 10" has a center facing transducer 34 which rings the transponder 32 in the center fish 10 and utilizes the answering frequency $f_2$ to control the rudders 35 so as to maintain a preselected separation between the fishes 10 and 10". The control of the rudders 33 snd 35, respectively, may be accomplished by known techniques such as utilizing a servoamplifier responsive to an error signal applied thereto as shown in FIG. 8 and functionally similar to the depth controlling arrangement shown in FIG. 6 to be described below. Referring again to FIG. 5 each of the fishes 10, 10' and 10" is provided with a depth transducer 36 which with its associated equipment shown in FIG. 6 is in accordance with the invention utilized to maintain the several fishes at a preselected constant height above the bottom.

The height above the bottom controlling apparatus diagrammatically illustrated in FIG. 6 may comprise a sonic depth sounder 37 including the downwardly directed transducer 36 for producing a signal having a parameter corresponding to the distance the transducer 36 is above the bottom. This depth signal is fed to a comparer 38 which compares it with a voltage on a terminal 39 which has been preset to a value corresponding to the height it is desired for the fish 10 to ride through the water. When the comparer 38 detects an error signal between the output of the depth sounder 37 and the preset voltage on terminal 39 it applies it to a servoamplifier 40 which powers a servomotor 41 to adjust through a suitable gear box 42 diving fins 43 carried on shafts 44 and suitably housed in each of the fishes 10, 10' and 10". Inasmuch as the sounding distance for the present application is in the order of only five or ten yards power requirements are quite moderate and since the operating range need not exceed about a foot or two above and below the selected height above the bottom the sounder need not be intricate. When not under the control of the depth sounder 37 the diving fins 43 have a strong negative angle of attack whereby the vehicle carrying the fins 43, when moved through the water dives until it is close enough to the bottom for the sounder 37 to take control. This novel arrangement for maintaining a towed vehicle at a constant height above the bottom is considered an important aspect of the present invention. Other circuit arrangements suitable for this purpose are described in my pending patent application Ser. No. 451,316 filed Aug. 20, 1954 and in patent application Ser. No. 674,982 filed July 29, 1957 by John A. Perkinson.

The apparatus shown in FIG. 8 for controlling the lateral spacing between the right hand and center vehicles 10" and 10, respectively, in the array of FIG. 5 may comprise a sonic echo ranger 80 including the left facing transducer 34 for producing a signal having a parameter corresponding to the distance the center vehicle 10 is from the transducer 34. The distance signal is fed to a comparer 81 which compares it with a voltage on a terminal 82 which has been preset at a value corresponding to the desired separation of the vehicles 10 and 10'. Error signals between the output of the echo ranger 80 and the preset voltage on the terminal 82 detected by the comparer 81 are applied to a servo amplifier 83 which powers a servo motor 84 to adjust through a suitable gear box 85 the rudder 35 to maintain the preselected vehicle separation. An equivalent system maintains the desired separation between the vehicles 10 and 10'.

Instead of employing a helical recorder as illustrated in FIG. 4 a visual presentation of the scansion values of the ocean bottom may be presented on the face of a cathode ray tube by utilizing the memory time of a magnetic tape on which the signals are recorded and repeatedly reproduced. One such arrangement suitable for this purpose is illustrated in FIG. 7 as comprising a loop of magnetic tape 50 slung around a polished non-metallic drum 51 and suitable guide rollers 52, 53, 54 and 55. A drive roller 56 engaging the tape 50 as it passes over the idler roller 54 may be driven in any suitable manner to advance the tape 50 at a speed S as indicated by the arrow. The drum 51 may be mounted for rotation about its axis as by a spider 57 and driven by any well known means (not shown) at a greater surface speed than and in the same direction as the magnetic tape 50 as indicated by the arrow 50S which here indicates a ratio between the speeds of one to fifty. Also carried by the spider 57 is a commutator having two segments 58 and 59 suitably insulated from the spider 57 and from each other as by segments of insulating material 61 which preferably extend inwardly from the commutator segments 58 and 59 to constitute cams which serve to close normally open contacts 62 and 63 each 180° of rotation of the drum 51 for the purpose described below. Each of the commutator segments 58 and 59 are connected to individual pickups 64 which rotate with the drum 51. A brush 65 riding on the commutator is so positioned that it contacts the commutator segment whose associated pickup 64 traverses the 180° wrap of the tape 50 on the drum 51 the arrangement being that as one pickup 64 leaves this 180° sector its associated commutator segment, 59 as shown in FIG. 7, leaves the brush 65 and the commutator segment 58 engages the brush 65 as its associated pickup 64 enters the said 180° sector. A recording head 66 connected to the receiver 23 shown in FIG. 4 records the scansion values of the scanning transducer on the magnetic tape 50 prior to its entry into the 180° sector in which the pickups 64 operate. At some suitable point between the idler roller 52 and the recording head 66 an erasing head 67 is positioned to erase the signal from the tape 50.

With the arrangement just described it will be evident that the playback heads 64 will reproduce the intelligence recorded on the tape 50 many time during its passage through the aforesaid 180° sector, and in the example given each scanning line recorded will be reproduced forty-nine times. The intelligence signals taken off by the brush 65 are passed through an amplifier 68 to the intensity grid 69 of a cathode ray tube 71 provided with a horizontal sweep circuit 72 and a vertical sweep circuit 73 suitably adjusted so that the desired presentation will appear as indicated at 74. The presentation 74 is sychronized with the active pickup head 64 by means of a sync pulse generator 75 connected to be triggered each time the contacts 62 and 63 are closed by the camming action of the insulating segments 61 as above described. With this arrangement the presentation 74 will contain approximately forty-nine horizontal scanning lines and will gradually creep up (or down) as the top line is removed to present a shadowgraph of the ocean floor as it is slowly moving past the observation window comprising the face of the cathode ray tube 71. Although this form of presentation is ephemeral, whenever anything of interest appears on the screen it can be readily photographed to provide a permanent record.

It will be understood that when a multiple array such as shown in FIG. 5 is employed the presentation systems of either FIGS. 4 or 7, or any other system, will be utilized with each scanning transducer so that with three oppositely scanning fish six presentation systems are required which together show the approximate shape, size and location of bottom objects along a path six hundred feet wide.

In the operation of the system above described the towed array is streamed in the seaway in any suitable manner not here pertinent and placed under tow over that portion of the sea bottom which it is desired to search for objects on the bottom, here assumed to be ground mines which when found classified by their appearance on the shadowgraph presentation are destroyed, removed or otherwise rendered harmless by any of the many existing techniques. As is well known it is generally desirable to keep the towing vessel in safe water, i.e., a path already swept, and for this purpose the scanning array of the invention may in the usual way, by means of a diverter, be caused to tow along a path laterally spaced from the path of the towing vessel. The operations described thus far are those related to seamanship and navigation and since they form no part of the present invention they will not be described in detail nor shown in the drawing.

With the array of FIG. 1 under tow the scanning fish 10 will ride along at a constant height above the bottom 16 and scan successive sections of the bottom extending thawartships. The sonic energy receiver is adjusted so that the relatively weak signals received from unencumbered bottom sections will be lightly recorded on the record medium 25 or the cathode ray display 74, the stronger signals from mine-like objects will be more heavily recorded and there will be no signal and no recording between the time the scanning pulse clears an object and again strikes the bottom beyond the object. This no-signal period constitutes the sonic shadow cast by an object proud on the bottom and since the geometry of the array is known this shadow provides information with respect to the dimensions of the objects casting this shadow, and it is from these dimensions that mine-like objects can be distinguished from nonmine-like objects such as automobile tire casings, large oil drums and the like. It is generally desirable to advance the record medium 25 at a rate directly correlated with the ship's speed to provide a one by one recording to facilitate classification.

The operation of the multiple towed array will be obvious from the described operation of the single array. With whatever scanning array employed it is to be understood that suitable arrangements may be incorporated in the system for dropping a buoy or other marking or destructive device when the operator decides that a mine-like object has been discovered.

In order that the recordings may be most readily comprehensible to an observer they are preferably arranged to relate themselves directly to the locale, i.e., the system scanning to starboard as indicated in FIG. 4 would be recorded from left to right on the record medium 25, while the port side scanning system would be recorded from right to left. In each case the recorder is of course synchronized with the transmitter or the received echoes so that a record line is directly correlated with a bottom scanned line which in the case of the system of FIG. 4 may be accomplished by having the rotating helix of the recorder 24 trigger the transmitter 21 as indicated by the lead 30 and in the case of the system of FIG. 7 may be accomplished by utilizing the initial voltage pulse of a train of received signals to be recorded to trigger the horizontal sweep circuit 72.

It is to be understood that the depth controlling vehicle in the array of FIG. 1 may be equipped with the sonic sounder type of height above the bottom control shown in FIG. 6.

From the foregoing disclosure it will be obvious that many modifications and variations in the various components employed may readily be made within the scope of the invention, it being understood that the embodiments shown for the purpose of describing the invention to those skilled in the art are exemplary of their functioning and that within the scope of such functioning great variation in design detail is permissible and expected. It is thus apparent that within the scope of the appended claims the invention may be practiced otherwise than as specifically described herein.

What is claimed is:

1. A towable spread for surveying a water-submerged surface with a single towing vessel comprising at least two laterally spaced submarine vehicles of which at least one is dirigible, tow cables of substantially equal lengths attached to said vehicles means operable under towing conditions to cause said vehicles to seek and maintain a preselected constant distance above the surface being surveyed, power means carried by the dirigible vehicle for steering the course of said dirigible vehicle, distance sensing means for deriving a signal corresponding to the lateral separation of the two vehicles, and means responsive to the departure of said derived signal from a preselected value for developing a corresponding control signal for said power means.

2. A towable spread in accordance with claim 1 wherein the distance sensing means comprises a sonic echo ranging device.

3. A towable spread in accordance with claim 1 wherein the signal deriving means comprises a sonic ranging apparatus including a transponder which has an answering frequency different from its ringing frequency.

4. A towable spread in accordance with claim 3 wherein there are two dirigible vehicles laterally spaced on opposite sides of a third vehicle, said third vehicle having two transponder units with ringing and answering frequencies which are all different, and the two dirigible vehicles have sonic ranging apparatus which cooperate with different ones of said transponders.

* * * * *